(12) United States Patent
Dennis et al.

(10) Patent No.: US 12,312,504 B2
(45) Date of Patent: May 27, 2025

(54) THERMALLY REWORKABLE ADHESIVES FOR ELECTRONIC DEVICES

(71) Applicant: International Business Machines Corporation, Armonk, NY (US)

(72) Inventors: Joseph Michael Dennis, Chicago, IL (US); Andy Theodora Tek, San Jose, CA (US); Robert David Allen, Golden, CO (US)

(73) Assignee: International Business Machines Corporation, Armonk, NY (US)

( * ) Notice: Subject to any disclaimer, the term of this patent is extended or adjusted under 35 U.S.C. 154(b) by 816 days.

(21) Appl. No.: 17/071,850

(22) Filed: Oct. 15, 2020

(65) Prior Publication Data

US 2022/0119689 A1    Apr. 21, 2022

(51) Int. Cl.
| | | |
|---|---|---|
| C09J 163/00 | (2006.01) | |
| C08G 59/20 | (2006.01) | |
| C08G 59/50 | (2006.01) | |
| C08K 3/04 | (2006.01) | |
| C08K 3/08 | (2006.01) | |
| C08K 3/22 | (2006.01) | |

(Continued)

(52) U.S. Cl.
CPC ............ *C09J 163/00* (2013.01); *C08G 59/20* (2013.01); *C08G 59/50* (2013.01); *C08K 3/041* (2017.05); *C08K 3/08* (2013.01); *C08K 3/22* (2013.01); *C08K 3/36* (2013.01); *C08K 3/40* (2013.01); *C08K 5/13* (2013.01); *C08K 5/1515* (2013.01); *C09J 7/35* (2018.01); *C08K 2003/0806* (2013.01); *C08K 2003/2227* (2013.01); *C09J 2203/326* (2013.01); *C09J 2301/502* (2020.08); *C09J 2463/00* (2013.01)

(58) Field of Classification Search
CPC .... C08G 59/22; C08G 59/50; C09J 2301/502; C09J 163/00–10; C08L 63/00–10
See application file for complete search history.

(56) References Cited

U.S. PATENT DOCUMENTS

| | | | |
|---|---|---|---|
| 3,435,003 A | | 3/1969 | Craven |
| 4,769,399 A | * | 9/1988 | Schenz .................. C08L 63/00 523/213 |

(Continued)

FOREIGN PATENT DOCUMENTS

KR    20120057941 A  *  6/2012

OTHER PUBLICATIONS

Partial machine translation of KR-20120057941-A (Year: 2024).*

(Continued)

*Primary Examiner* — Kregg T Brooks
(74) *Attorney, Agent, or Firm* — Jeffrey M. Ingalls

(57) ABSTRACT

A thermally reworkable adhesive includes at least one di-epoxide, at least one diamine that is reactive with the at least one di-epoxide, at least one additive that is miscible, but not reactive, with the at least one di-epoxide and/or the at least one diamine. Reaction of the at least one di-epoxide and the at least one diamine forms a crosslinked polymer network and the at least one additive offsets the stoichiometry of the crosslinked polymer network by 5-50%. The offset crosslinked polymer network forms the thermally reworkable adhesive that once cured, at a temperature in the range of 20-200° C., can be de-bonded from a device to which it is attached at a temperature in the range of 50-200° C.

13 Claims, 19 Drawing Sheets

(51) Int. Cl.
*C08K 3/36* (2006.01)
*C08K 3/40* (2006.01)
*C08K 5/13* (2006.01)
*C08K 5/1515* (2006.01)
*C09J 7/35* (2018.01)

(56) References Cited

U.S. PATENT DOCUMENTS

| | | | | |
|---|---|---|---|---|
| 5,002,818 | A | * | 3/1991 | Licari .................. H01L 24/83 |
| | | | | 428/209 |
| 5,457,149 | A | * | 10/1995 | Hall ..................... H01L 24/28 |
| | | | | 525/107 |
| 5,499,807 | A | | 3/1996 | Nakamura et al. |
| 6,288,170 | B1 | * | 9/2001 | Waid ................... C09J 5/00 |
| | | | | 523/412 |
| 6,380,322 | B1 | | 4/2002 | Wong et al. |
| 7,012,120 | B2 | | 3/2006 | Klemarczyk et al. |
| 7,288,161 | B2 | | 10/2007 | Hanley et al. |
| 7,393,419 | B2 | | 7/2008 | Sachdev et al. |
| 8,251,163 | B2 | | 8/2012 | Xie et al. |
| 9,450,482 | B2 | | 9/2016 | Drummond |
| 2004/0155364 | A1 | * | 8/2004 | Doba .................. H01L 23/293 |
| | | | | 257/E21.503 |
| 2008/0051524 | A1 | * | 2/2008 | Ji ....................... C09J 163/00 |
| | | | | 525/476 |

OTHER PUBLICATIONS

Aubert, Thermally Removable Epoxy Adhesives Incorporating Thermally Reversible Diels-Alder Adducts, The Journal of Adhesion 79(6):609-616 (2003).
Banea et al., An Overview of the Technologies for Adhesive Debonding on Command, The Annals of "Dunarea de Jos" University of Galatia, 24:11-14 (2013).
Hutchinson et al., Overview of Disbonding Technologies for Adhesive Bonded Joints, The Journal of Adhesion 93 (10):1-19 (2016).
Kim et al., Reversible dry micro-fibrillar adhesives with thermally controllable adhesion, Soft Matter 5:3689-3693 (2009).
Luo et al., A thermally responsive, rigid, and reversible adhesive, Polymer 51:1169-1175 (2010).
Schenzel et al., Reversing Adhesion: A Triggered Release Self-Reporting Adhesive, Advanced Science 3 (1500361): 1-5 (2016).
Zhang et al., Preparation and properties of heat and ultraviolet-induced bonding and debonding epoxy/epoxy acrylate adhesives, J. Appl. Polym. Sci. 46435:1-8 (2018).

* cited by examiner

THERMALLY REWORKABLE ADHESIVES FOR ELECTRONIC DEVICES

TECHNICAL FIELD

The present invention relates generally to adhesives and more specifically to thermally workable adhesives that may be bonded and de-bonded from electronic devices.

BACKGROUND OF THE INVENTION

Thermoset adhesives have widespread use throughout many industries as the gold standard for adhesion and longevity. Epoxies are among the most common thermoset adhesives because of their ability to bond an extensive list of materials; however, the intractability of thermosets post-cure has attracted much attention as an area for improvement. In many situations, the adhesive outlasts the device for which it was designed to adhere, requiring the device to be discarded. Because the adhesive in these circumstances is inexpensive relative to the adhered device, the ability of an adhesive to bond and de-bond from an external stimulus is an important feature to end users for cost savings and recyclability.

SUMMARY OF THE INVENTION

In one embodiment, the present invention relates to a composition comprising: at least one di-epoxide; at least one diamine that is reactive with the at least one di-epoxide; and at least one additive that is miscible, but not reactive, with the at least one di-epoxide and/or the at least one diamine, wherein (i) reaction of the at least one di-epoxide and the at least one diamine produces a crosslinked polymer network, (ii) the at least one additive offsets stoichiometry of the crosslinked polymer network by 5-50%, and (iii) the offset crosslinked polymer network comprises a thermally reworkable adhesive that once cured, can be de-bonded from a device to which it is attached at a temperature range of 50-200° C.

In another embodiment, the present invention relates to a composition comprising: at least one di-epoxide; at least one diamine that is reactive with the at least one di-epoxide; and at least one additive comprising at least one phenoxy-based resin and at least one reactive diluent, wherein the at least one additive is miscible, but not reactive, with the at least one di-epoxide and/or the at least one diamine, wherein (i) reaction of the at least one di-epoxide and the at least one diamine produces a crosslinked polymer network, (ii) the at least one additive offsets stoichiometry of the crosslinked polymer network by 5-50%, and (iii) the offset crosslinked polymer network comprises a thermally reworkable adhesive that once cured, can be de-bonded from a device to which it is attached at a temperature range of 50-100° C.

In one aspect, the present invention relates to a method comprising: mixing a formulation comprising at least one di-epoxide, at least one diamine, and at least one additive, wherein (i) the at least one additive is miscible, but not reactive, with the at least one di-epoxide and/or the at least one diamine, (ii) reaction of the at least one di-epoxide and the at least one diamine forms a crosslinked polymer network, (iii) the at least one additive offsets stoichiometry of the crosslinked polymer network by at least 5-50%, and (iv) the offset crosslinked polymer network comprises a reworkable adhesive; applying the reworkable adhesive to a device; curing the reworkable adhesive onto the device; heating the cured reworkable adhesive to a temperature in the range of 50-200° C.; and removing the cured reworkable adhesive from the device.

Additional aspects and/or embodiments of the invention will be provided, without limitation, in the detailed description of the invention that is set forth below.

DETAILED DESCRIPTION OF THE INVENTION

Figure 1:
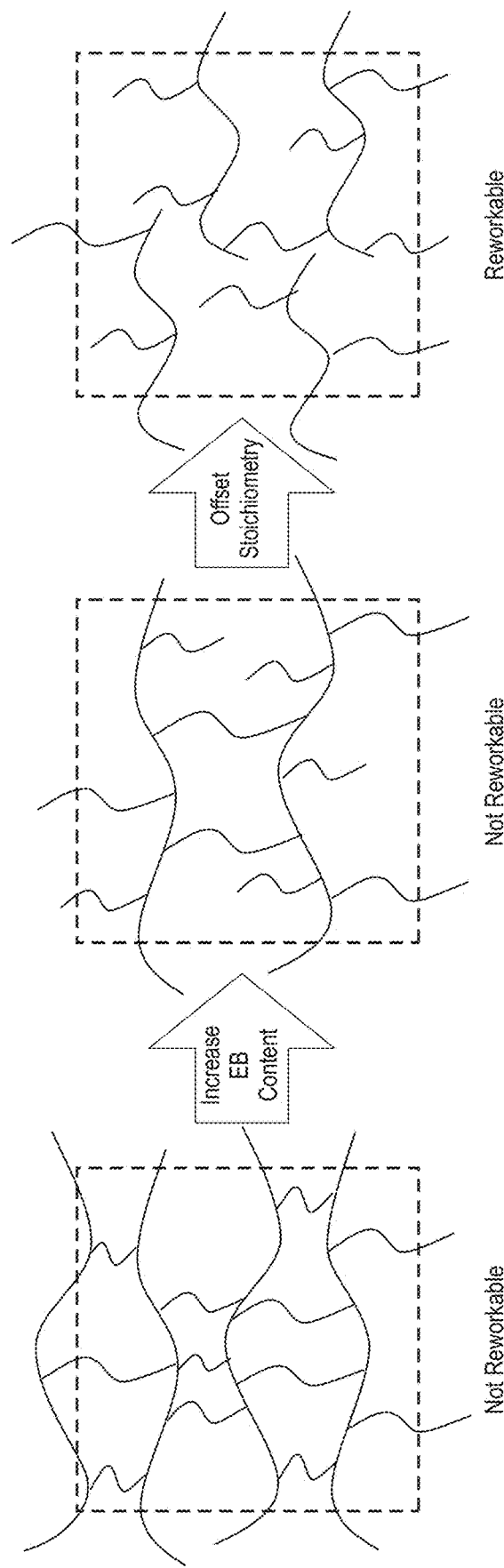
FIG. 1 is a diagram showing changes in cured polymer networks with increasing mono-functional additives and offset stoichiometry, as described herein.

Set forth below is a description of what are currently believed to be preferred aspects and/or embodiments of the claimed invention. Any alternates or modifications in function, purpose, or structure are intended to be covered by the appended claims. As used in this specification and the appended claims, the singular forms "a," "an," and "the" include plural referents unless the context clearly dictates otherwise. The terms "comprise," "comprised," "comprises," and/or "comprising," as used in the specification and appended claims, specify the presence of the expressly recited components, elements, features, and/or steps, but do not preclude the presence or addition of one or more other components, elements, features, and/or steps.

As used herein, the term "epoxy" refers to a cured thermosetting resin made by copolymerization of an epoxide with another compound having two hydroxyl groups. Within the context of the present invention, an epoxy resin is uncured epoxy in its liquid form. The combination of an epoxy resin and one or more curing agents hardens the epoxy resin into cured epoxy. The combination of an epoxy resin and a curing agent is known in the art as a "two-part" epoxy formulation since the epoxy resin is combined with a curing agent, typically (but not necessarily) in equal amounts. Epoxy resins generally include one or more bisphenol compounds, which are a group of chemical compounds with two hydroxyphenyl functionalities. Examples of bisphenol compounds include, without limitation, diphenylmethane and derivatives and benzhydryl and derivatives. The most commonly used bisphenol in epoxy resins is Bisphenol A (BPA).

As used herein, the term "epoxide" refers to a cyclic ether molecule with a three-ring functionality, the latter of which approximates an equilateral triangle, which strains the cyclic either molecule to make it highly reactive. Examples of epoxides include, without limitation, ethylene oxide (EtO), propylene oxide, epichlorohydrin, and glycidyl ethers. The reaction of epichlorohydrin (an epoxide) and Bisphenol A (a compound with two hydroxyl groups) produces the epoxy resin, Bisphenol A diglycidyl ether (DGEBA).

As used herein, the term "di-epoxide" refers to a compound that has two epoxide groups. The epoxy resin DGEBA is a di-epoxide by virtue of the molecule's diglycidyl ether functional group.

As used herein, the term "functional filler" refers to an epoxy resin additive that promotes thermal workability of the adhesive formulations described herein. Examples of functional fillers include, without limitation, phenoxy-based resins, also known as polyhydroxyethers, which are amorphous thermoplastic polymers.

As used herein, the term "reactive diluent" refers to an additive that is added to an epoxy resin formulation to reduce its viscosity and to adjust the rheology of the formulation.

As used herein, the term "mono-functional epoxide" refers to a compound containing a single epoxide group. Within the context of the present invention, mono-functional epoxides are used as additives to epoxy resins. Examples of mono-functional epoxide additives include, without limitation, 1,2-epoxybutane (EB) and glycidyl ethers (aliphatic and aromatic) as reactive diluents and glycidyl 3-(trimethoxysilyl)propyl ether (GLYMO) as an adhesion promotor.

As used herein, the term "amine" refers to compounds and functional groups that contain a nitrogen atom with a lone pair.

As used herein, the term "diamine" refers to an amine compound that has two amino groups. Within the context of the present invention, a diamine serves as the curing agent in the two-part epoxy formulation. Diamine curing agents include cycloaliphatic diamines, aliphatic diamines, aryl diamines, and combinations thereof. Examples of diamine curing agents include, without limitation, piperidine, menthanediamine, N-aminoethylpiperazine (AEP), diethylene triamine (DETA), isophorone diamine (IPDA), methylcyclohexyl diamine (MCDA), meta-xylene diamine (MXDA), para-diaminodicyclohexylmethane (PACM), and trimethyl hexane diamine (TMHD).

As used herein, the term "stoichiometry" is used to refer to the quantitative relationship between constituents in a chemical substance. The use of the terms "offset" and "offsets" in relation to the stoichiometry of a chemical substance is meant to refer to an adjustment in the amount of one or more constituents of the chemical substance that diminishes or balances the effects of other constituents of the chemical substance.

As used herein, the terms "cure," "cured," and "curing" refers to the time that it takes for adhesive materials (e.g., di-epoxide and diamine) to react and convert from flexible bonds to rigid bonds that are temperature, humidity, and chemically resistant. Adhesives may be cured with heat, radiation, pressure, and/or chemical treatment. Thermoset adhesives are adhesives that are irreversibly changed by the curing process and thermoplastic adhesives are adhesives that can be re-melted and reshaped after curing. With thermoset adhesives, crosslinks form between individual polymer chains of the adhesive material producing a material that will deform, rather than melt, if it is reheated after curing. With thermoplastic adhesives, polymer chains must permanently deformed through reptation. As is known to those of skill in the art, reptation in polymer processes, such as extrusion and injection molding of thermoplastics, generally requires temperatures well above 100° C. In general, melt processing requires temperatures ~100° C. above the glass transition ($T_g$) because of viscosity constraints.

As used herein, the terms "bond," "bonding, and "bonded," refers to the adhesion of cured adhesive to a device.

As used herein, the terms "de-bond," de-bonding," and "de-bonded," refer to the separation of cured adhesive from a device. The term "de-bondability" refers to the ability of a cured adhesive to separate from a device under certain conditions. Within the context of the present invention, the adhesives disclosed herein have thermal de-bondability.

As used herein, the term "thermal reworkability" and "thermally reworkable adhesive" refer to an adhesive that is capable of being de-bonded from a device by means of heating (i.e., has thermal de-bondability).

As used herein, the term "device" is meant to refer to any device to which the adhesives disclosed herein may be bonded. Such devices will typically, but not necessarily, be electronic devices.

As used herein, the term "initial viscosity" refers to the pre-cure viscosity of an adhesive material.

As used herein, the term "work life" refers to the amount of time that an adhesive has a viscosity that is low enough that it can be applied to a device.

Described herein is a two-part, epoxy-amine formulation comprising at least one di-epoxide and at least one diamine that can be cured at a temperature in the range of 20-200° C. and de-bonded from a surface to which it is attached at a temperature in the range of 50-200° C. The formulation achieves post-cure de-bonding through the dissolution of a thermoplastic material into reactive monomers having reduced viscosity in comparison to the cured material. The formulation, once applied, is polymerized into a highly branched, interpenetrating polymer network with a high $T_g$ that can be thermally de-bonded.

FIG. 1 illustrates a network structure for building a reworkable adhesive with successive iterations of the formulation following the inset arrows. From a starting point of a commercial adhesive (1st panel), the first iteration is the addition of the epoxy butane (EB) as a reactive diluent to reduce the initial viscosity of the adhesive (2nd panel); however, the epoxy butane alone is not sufficient to produce a reworkable adhesive formulation. In the second iteration, the stoichiometry of the polymer chains is offset to minimize the probability of a percolated network at high reaction conversions. At this stage, the cured material is a reworkable highly branched epoxy network and high-molecular-weight thermoplastic (3rd panel).

Within the context of the present invention, the polymer chains of the thermally reworkable adhesive are crosslinked polymer chains comprised of epoxide groups of at least one di-epoxide polymer and amino groups of at least one diamine polymer. In one embodiment, the stoichiometry of the crosslinked polymer chains within the reworkable adhesive is offset by 5-50%. In another embodiment, the stoichiometry of the crosslinked polymer chains is offset by 20-50%. In a further embodiment, the stoichiometry of the crosslinked polymer chains is offset by 40-50%.

Figure 2:
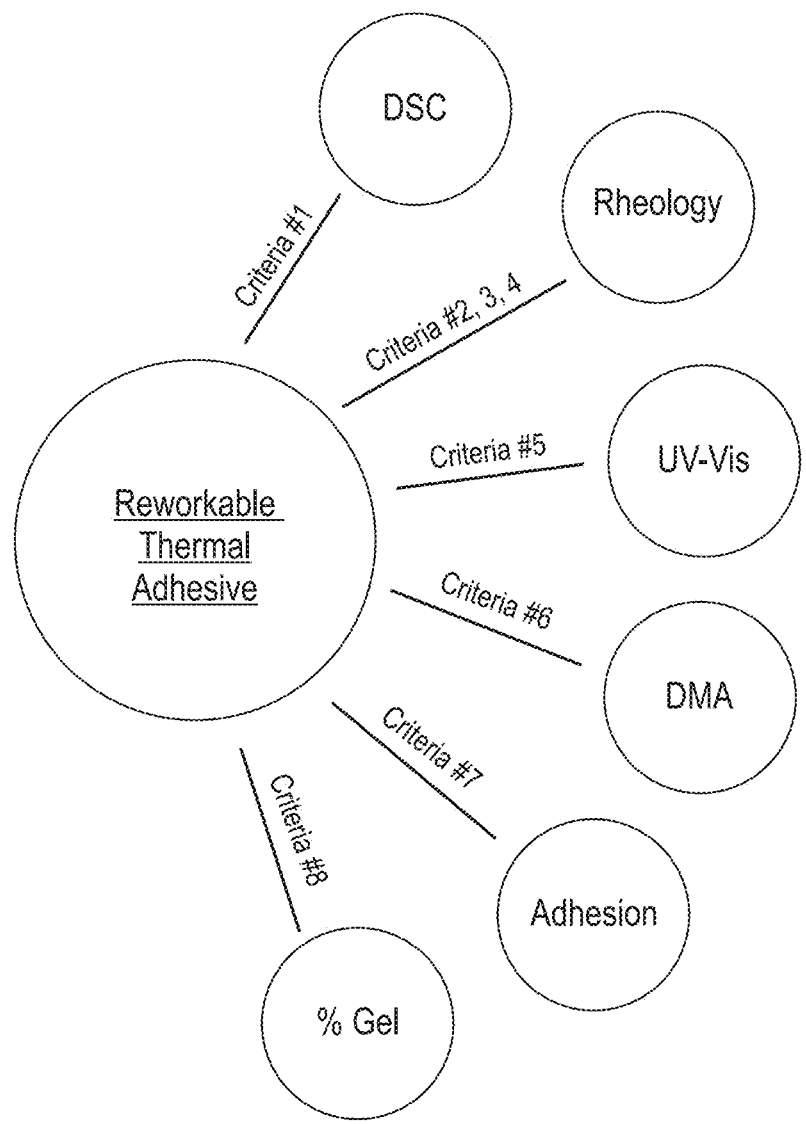
FIG. 2 is a diagram of criteria used to develop the thermally reworkable adhesives described herein.

Following the procedures described in Examples 1-8, the formulations in Tables 1 and 2 evaluate their potential as a reworkable adhesive in infrared (IR) sensors. FIG. 2 outlines the criteria that were used to analyze the formulations, specifically: $T_g$ as measured with differential scanning calorimetry (DSC) (criteria 1; Example 1); rheology, i.e., initial viscosity at 25° C., work life, and thermal bonding (criteria 2, 3, 4; Examples 2, 3, and 4, respectively); UV transmission at 550 nm (criteria 5; Example 5); thermal cycling as measured with a dynamic mechanical analyzer (DMA) (criteria 6; Example 6); adhesion (criteria 7; Example 7); and % gel fractionation (criteria 8; Example 8). Table 1 provides the raw values for the formulations as measured, Table 2 provides the weight percent of the final formulation mixture, and Table 3 provides constants figures required to calculate the molar ratios of the formulations. The data was generated in a sequential fashion and the results were used to guide the next generation of design. For example, formulation RA #1 was used as an initial platform to establish the feasibility of a reworkable solution. While the RA #1 formulation was thermally reworkable at relevant temperatures, mixing and applying the adhesive was difficult because the viscosity was too high. Leveraging observations derived from RA #1, RA #2-5 were designed to improve handling by reducing the initial viscosity. The reduction in viscosity was obtained through a reduction in the content of the phenoxy-based functional filler, PKHC, and sequential increases in the reactive diluent epoxy butane (EB) (Table 2). The formulations RA #2-5 OS are identical to RA #2-5 except the mixing ratio for the RA OS formulations is strategically offset to decrease the probability of a percolating network and mimic the network structure of FIG. 1. In calculating the molar ratios (Table 3), the PKHC is not considered since it is a non-reactive compound. The reactive groups are the epoxide and the amine. With reference to Tables 2 and 3, the diamines, MMCH and TMHD, have a reactivity of four because they can each react twice and the di-epoxide, DGEBA, has a reactivity of two because it also reacts twice. The mono-functional epoxide reactive diluent, EB, reacts once as does the mono-functional epoxide adhesion promotor, GLYMO.

TABLE 1

| Formulation | $T_g$ °C. | Initial Viscosity (25° C.) cps | Work Life H | Thermal Bonding 1 = Y 0 = N | Transmission (at 550 nm) % | Thermal Cycling 1 = Y 0 = N | Adhesion MP | Gel Fraction % |
|---|---|---|---|---|---|---|---|---|
| EPO-TEK 301 | 64 | 62 | 2 | 0 | 93 | 0 | 27 | 99 |
| RA#1 | 86 | 265000 | 0.25 | 1 | N/A | N/A | 11 | 85 |
| RA#2 | 108 | 2630 | 0.33 | 0 | 94 | 0 | 18 | 80 |
| RA#3 OS | 82 | 2000 | 1.2 | 1 | 93 | 0 | 16 | 75 |
| RA#4 OS | 75 | 3600 | 2 | 1 | 82 | 0 | 14 | 92 |
| RA#5 OS | 62 | 1800 | 1.2 | 1 | 94 | 0 | 27 | 88 |

TABLE 2

| Formulation | PKHC | EB | DGEBA | GLYMO | MMCH | TMHD | Molar Ratio Moles of epoxies to amine-hydrogens |
|---|---|---|---|---|---|---|---|
| | wt. % of Formulation | | | | | | |
| RA #1 | 19 | 7 | 57 | 0 | 12 | 5 | 1.28 |
| RA #2 | 9 | 6 | 62 | 0 | 16 | 7 | 0.97 |
| RA #3 | 9 | 12 | 54 | 0 | 18 | 8 | 0.93 |
| RA #4 | 8 | 16 | 49 | 0 | 19 | 8 | 0.96 |
| RA #5 | 8 | 11 | 54 | 1 | 18 | 8 | 0.91 |
| RA #2 OS | 8 | 7 | 73 | 0 | 8 | 4 | 2.16 |
| RA #3 OS | 8 | 14 | 63 | 0 | 11 | 4 | 1.92 |
| RA #4 OS | 8 | 19 | 55 | 0 | 13 | 5 | 1.66 |
| RA #5 OS | 8 | 14 | 62 | 1 | 11 | 4 | 1.92 |

PKHC = Polyhydroxyether (phenoxy-based functional filler);
EB = epoxy butane (mono-functional epoxide reactive diluent);
DGEBA = Bisphenol-A diglycidyl ether (di-epoxide);
GLYMO = Glycidyl 3-(trimethoxysilyl)propyl ether (mono-functional epoxide adhesion promotor);
MMCH = 4,4'-methylenebis(2-methylcyclohexylamine (alicyclic diamine);
TMHD = 2,2,4-Trimethyl-1,6-hexane diamine (diamine).

TABLE 3

| Compound | Molecular Weight | Reactivity per Molecule |
|---|---|---|
| DGEBA | 355 | 2 |
| EB | 72.11 | 1 |
| MMCH | 238.41 | 4 |
| TMHD | 158.28 | 4 |
| GLYMO | 236.34 | 1 |

For the compounds in Table 3, the molar ratio of the formulations in Table 2 is calculated with formula (1):

$$\text{Molar Ratio} = \frac{(\text{moles } EB * 1) + (\text{moles } DGEBA * 2) + (\text{moles } GLYMO * 1)}{(\text{moles } MMCH * 4) + (\text{moles } TMHD * 4)} \quad (1)$$

As an example, the foregoing formula is applied to RA #2 OS from Table 2 by taking the weight percentages for the EB, DGEBA, GLYMO, MMCH, and TMHD and dividing by 100 to obtain the weight fractions for the compounds. The weight fractions are multiplied by the target weight to obtain the weights of the reactive species in the formulation. The weight fractions are then divided by the molecular weights of the compounds to obtain the molar concentration of each compound. For a target weight of 100 g, the moles of reactive species per 100 g of formulation are: 0.0971 moles of EB; 0.2056 mole of DGEBA; 0 mole of GLYMO; 0.03356 mole of MMCH; and 0.02527 mole of TMHD. These figures are applied to Formula (1) to obtain the molar ratio for RA #2 OS as follows:

$$\text{Molar Ratio } RA \text{ \#2 } OS = \frac{(0.0971 * 1) + (0.2056 * 2) + (0 * 1)}{(0.03356 * 4) + (0.02527 * 4)} = 2.160313$$

FIGS. 3-8 are radar charts of the six formulations provided in Table 1. The radar charts allow for the visualization of the overall material performance of the adhesive formulations relative to ideal criteria where a value greater than unity is sought for each of the categories in the radar chart; values below unity indicate areas requiring improvement.

Figure 3:
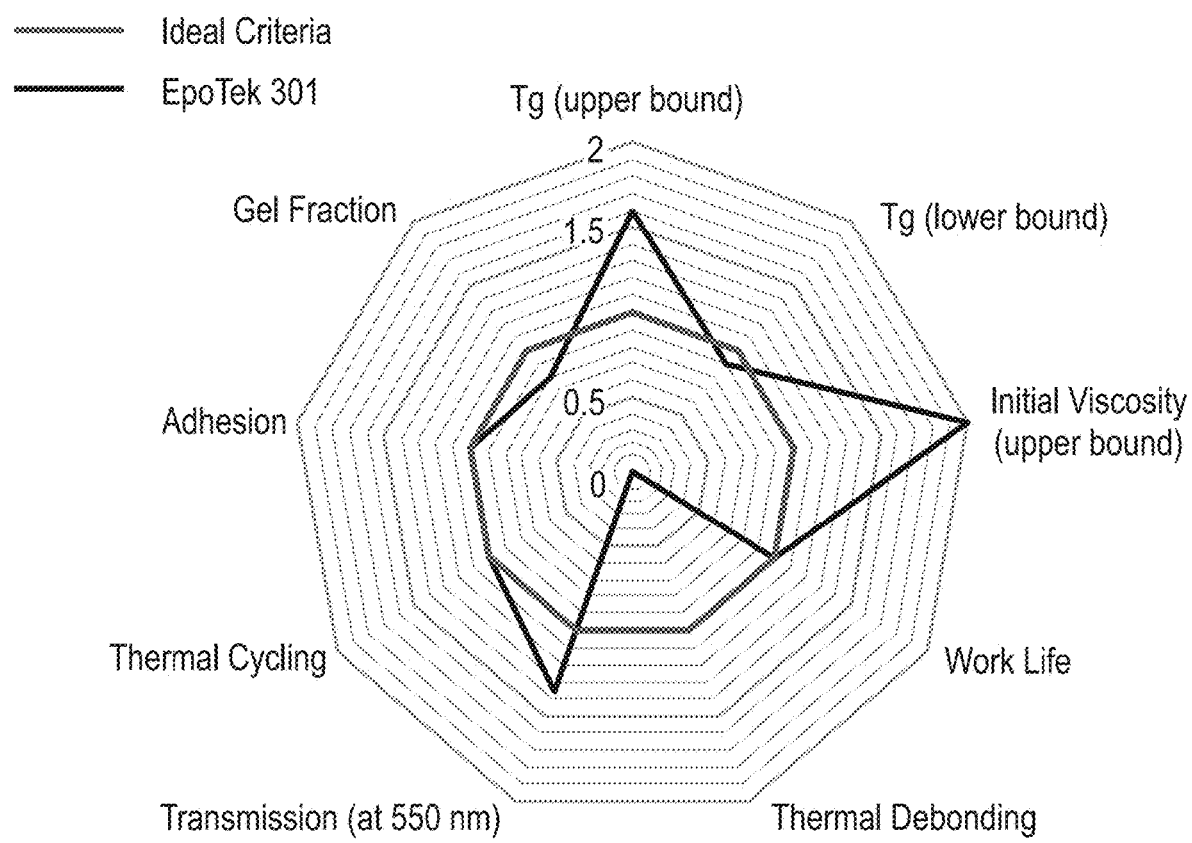
FIG. 3 is a radar chart of the highly cross-linked commercial epoxy, EPO-TEK® 301 (Epoxy Technology, Inc., Billerica, MA, USA) for comparative purposes.

FIG. 3 is a radar chart of the performance of the commercial epoxy, EPO-TEK® 301 (Epoxy Technology, Inc., Billerica, MA, USA), against the ideal criteria for a workable adhesive. While the EPO-TEK 301 performs well across most of the criteria (e.g., $T_g$ upper bound, $T_g$ lower bound, initial viscosity upper bound, work life, transmission at 550 nm, thermal cycling, adhesion, and gel fraction), it does not perform at all on thermal de-bonding highlighting that EPO-TEK 301 is not a suitable reworkable adhesive. The EPO-TEK 301, however, provides the baseline for the development of the reworkable adhesives described herein.

Figure 4:
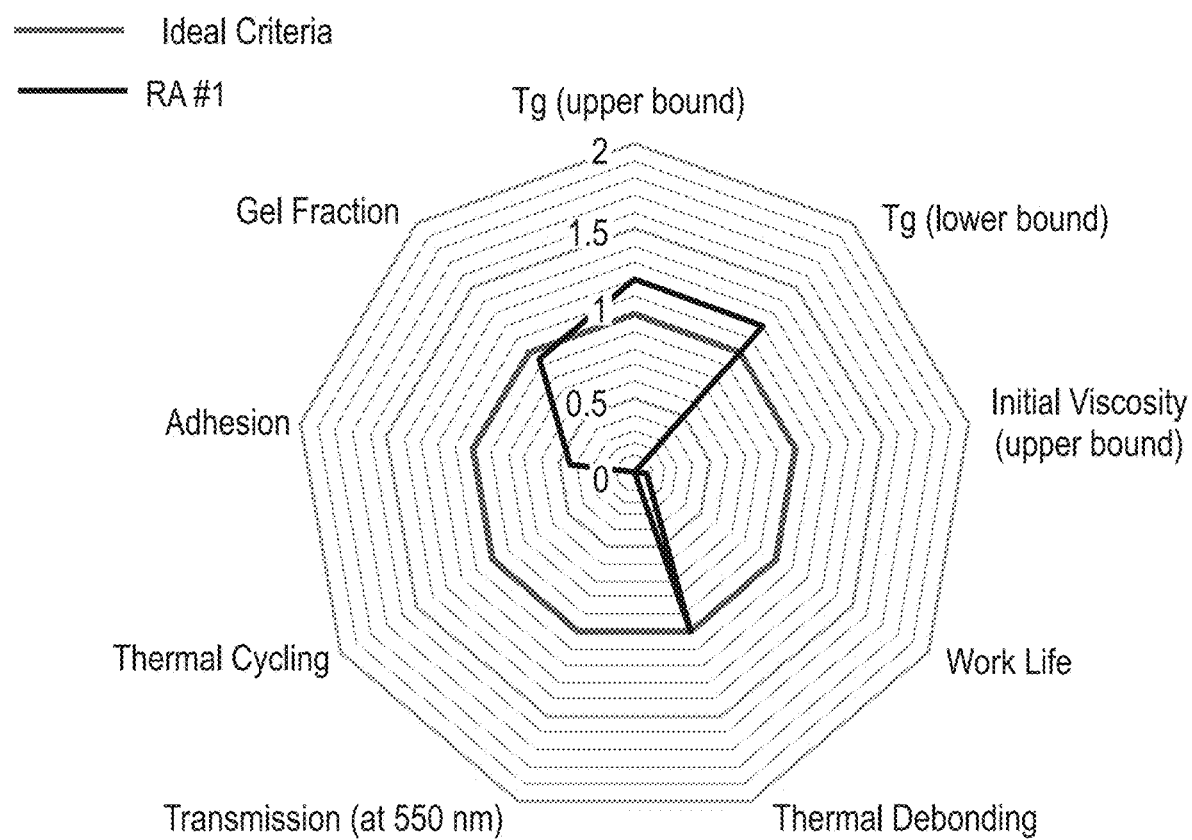
FIG. 4 is a radar chart of reworkable adhesive formulation RA #1 (Table 1).

FIG. 4 is radar chart of the performance of the initial formulation, RA #1, against the ideal criteria. The initial estimate of the $T_g$ at the upper and lower bounds is within ideal criteria range. While the RA #1 material is capable of thermal de-bonding at elevated temperatures after curing, the initial viscosity is too high at room temperature resulting in trapped bubbles in the material during mixing, thus preventing transmission and thermal cycling characterization.

Figure 5:
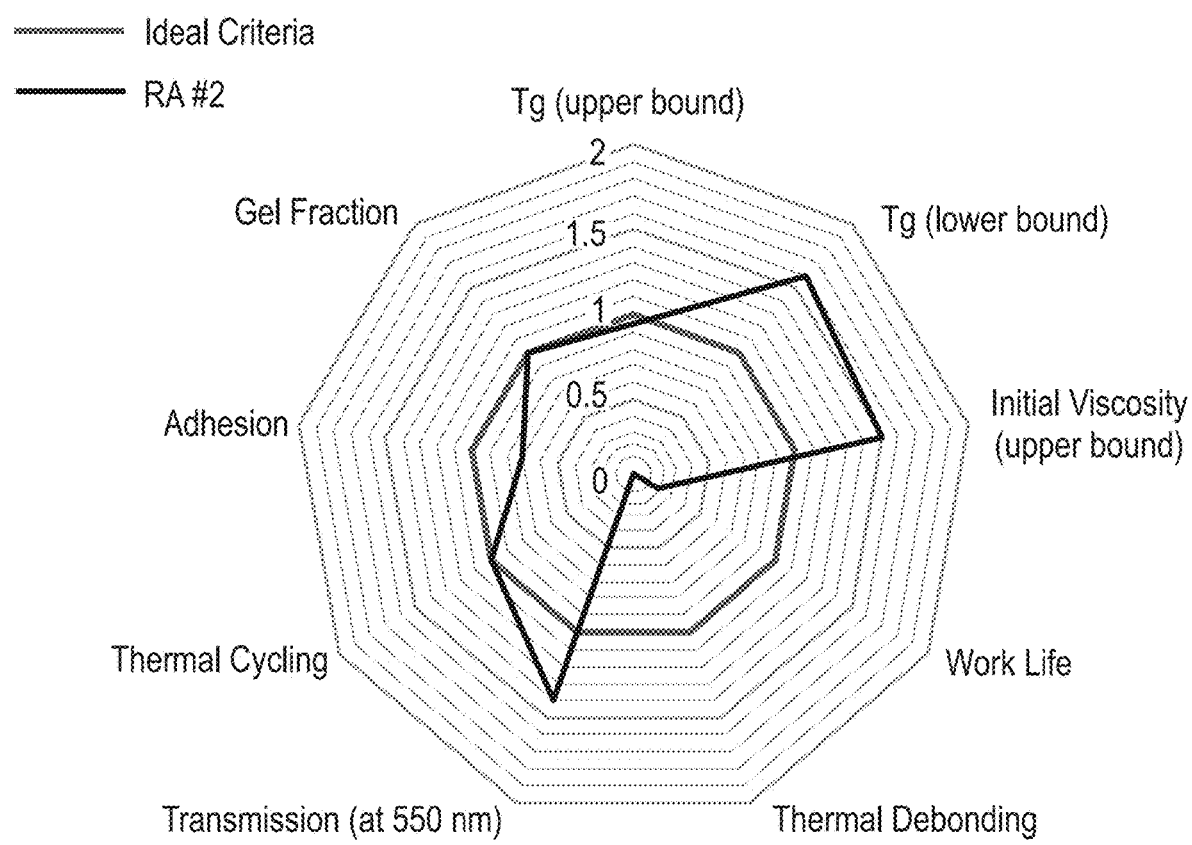
FIG. 5 is a radar chart of reworkable adhesive formulation RA #2 (Table 1).

FIG. 5 is a radar chart of the performance of RA #2 and represents the general trend for RAs #2-5 in Table 2. To correct the high initial viscosity of RA #1, the thermoplastics in RAs #2-5 were reduced and the epoxy butane was increased (Table 2). The result is a material with improved viscosity, but lacking suitable thermal de-bonding and work life. As shown in Tables 1 and 2, with the increasing concentration of epoxy butane, the $T_g$ and initial viscosity decrease while the adhesive strength improves. All formulations show low absorption of 550 nm light and zero fractures or delamination events during thermal cycling (Table 1).

Figure 6:
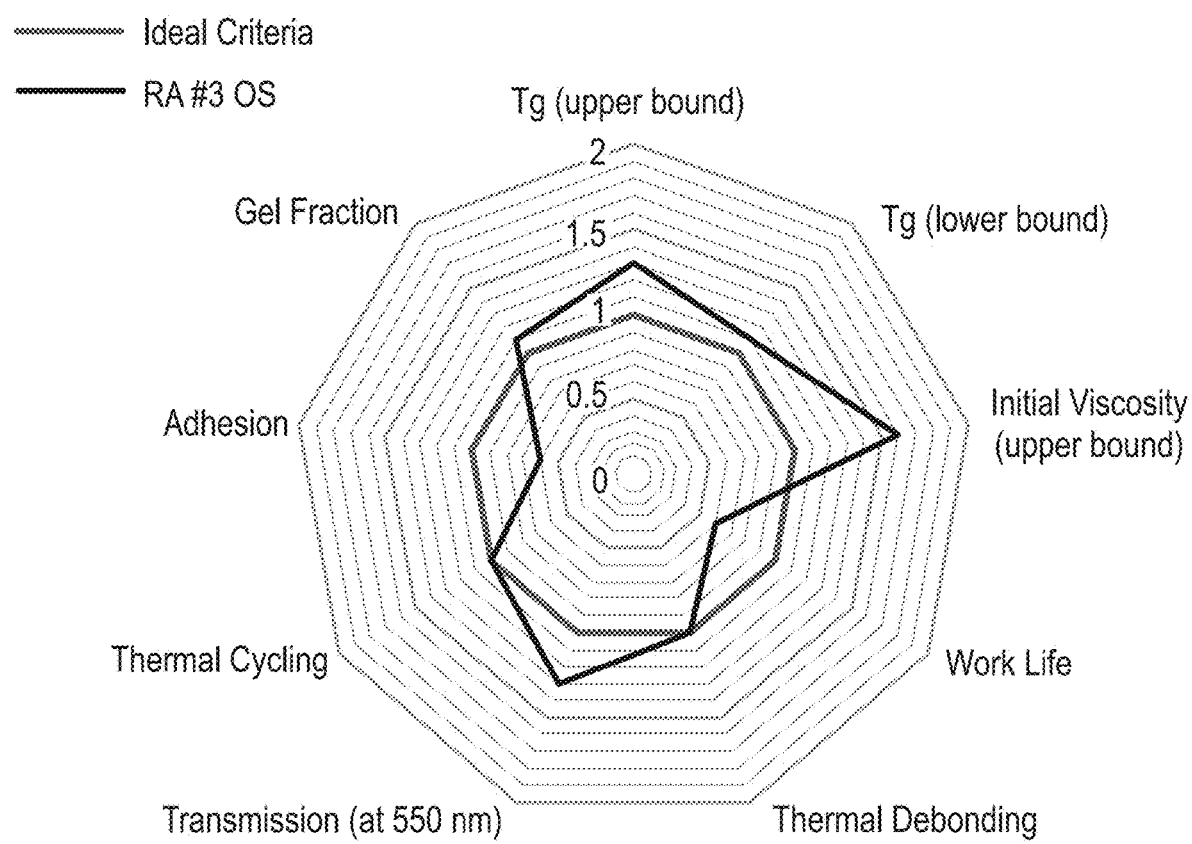
FIG. 6 is a radar chart of reworkable adhesive formulation RA #3 OS (Table 1).
Figure 7:
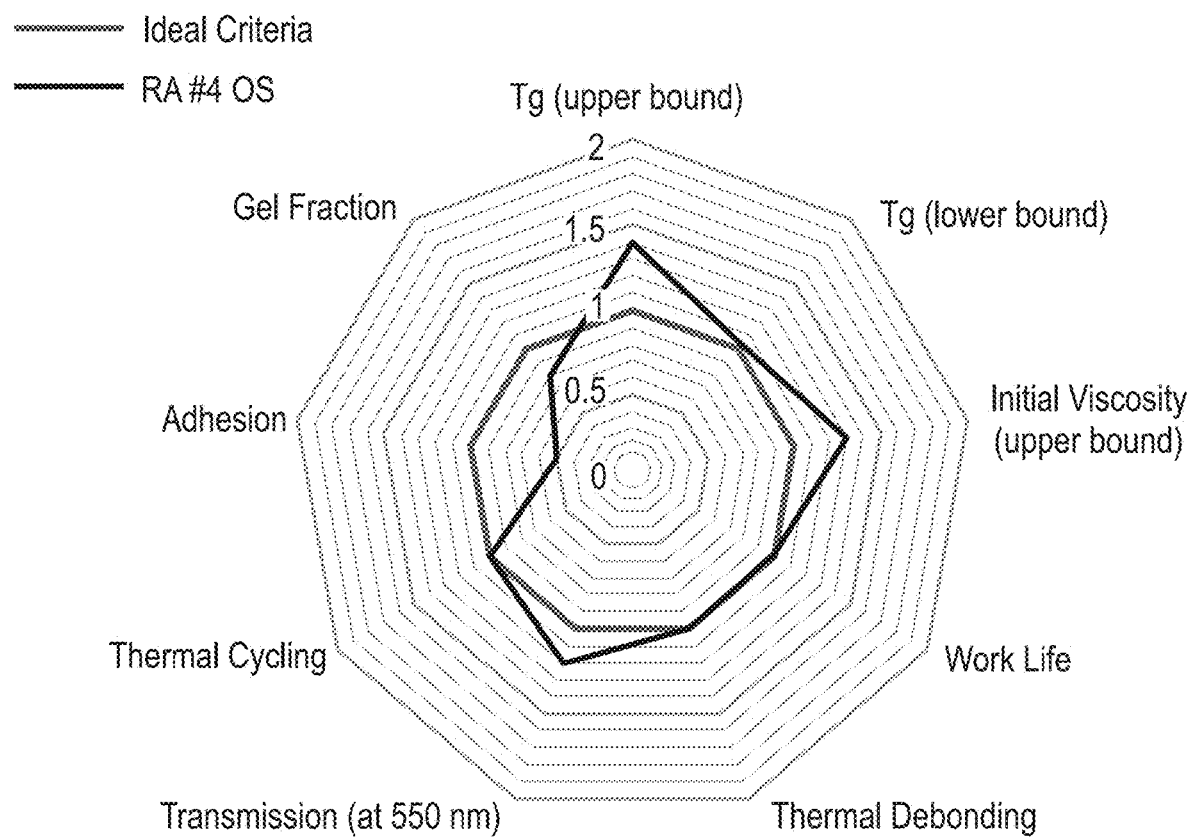
FIG. 7 is a radar chart of reworkable adhesive formulation RA #4 OS (Table 1).
Figure 8:
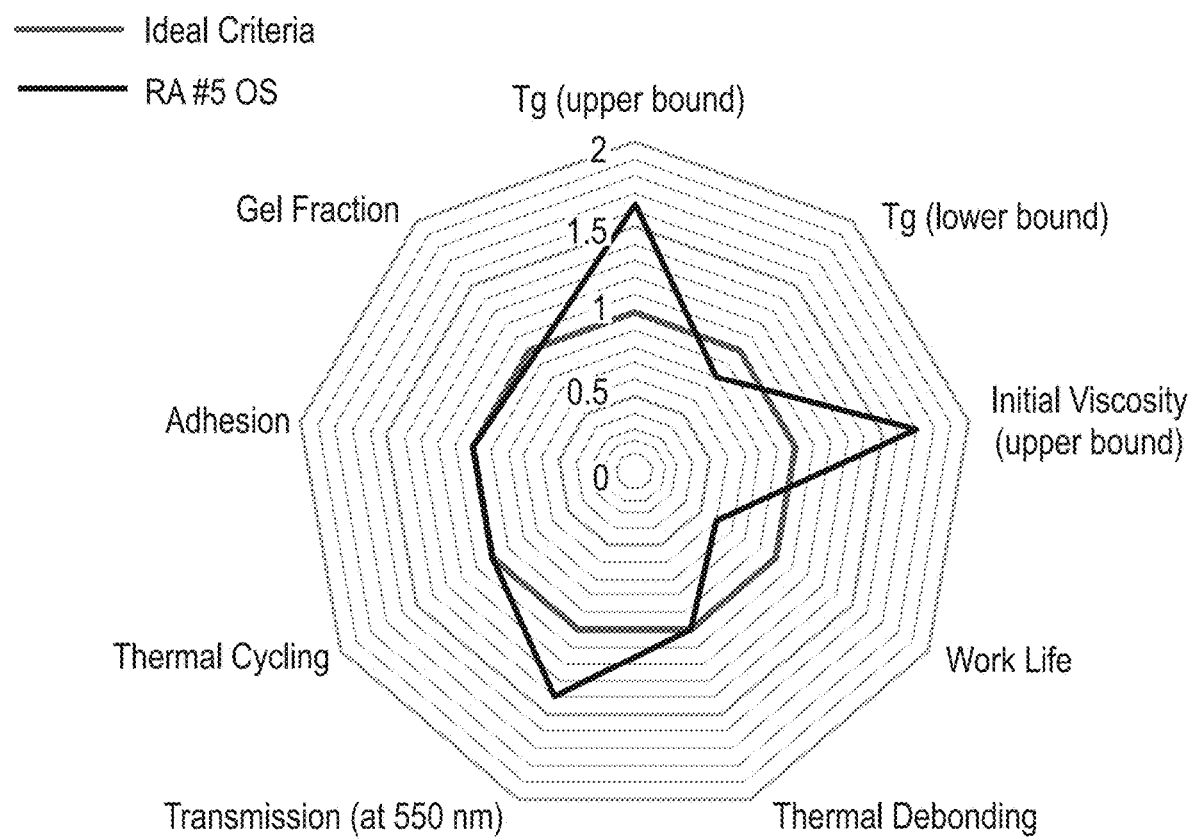
FIG. 8 is a radar chart of reworkable adhesive formulation RA #5 OS (Table 1).

RAs #2-5 OS (Table 2) improve upon the materials of RAs #2-5 by using an offset stoichiometry to minimize changes in material properties such as $T_g$, viscosity, and transmission, while increasing the probability of thermal reworkability. As depicted in FIG. 1, an offset stoichiometry reduces the chance of a percolated network to produce a hyperbranched, high-molecular-weight polymer with minimal crosslinks. FIGS. 6-8 are radar charts for RA #3 OS, RA #3 OS, and RA #5 OS, respectively. The offset stoichiometries of the RA OS formulations provide a thermally reworkable adhesive without compromising many of the ideal criteria parameters. Each of the RA OS formulations provide an advantage over the other thus providing the parameters for an ideal thermally reworkable material. RA #3 OS provides an optimal formulation for the $T_g$ range while maintaining the adhesive reworkability (FIG. 6). RA #4 OS provides the longest work life of the three formulations (FIG. 7). The relatively high concentration of epoxy butane in RA #4 OS suppresses the growth of the percolating network while causing minimal changes in the $T_g$ values. Surprisingly and unexpectedly, the addition of a small amount of the adhesion promoter (GLYMO) in the RA #5 OS formulation reduces the $T_g$ while improving adhesion performance (FIG. 8).

Figure 9:
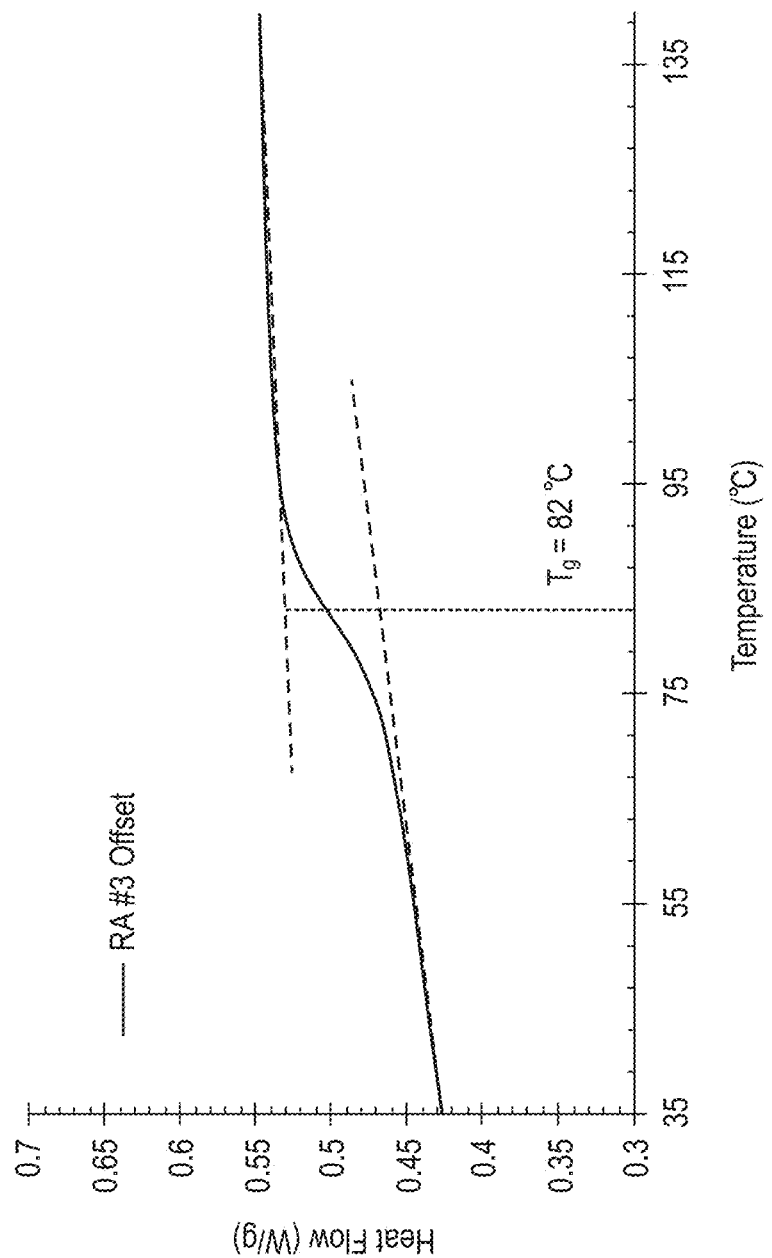
FIG. 9 is a graph showing temperature-dependent heat flow and the glass transition temperature ($T_g$) for the RA #3 OS formulation.

FIG. 9 is a graph showing heat flow as a function of temperature for the RA #3 OS formulation and the calculation of the $T_g$ for the RA #3 OS as 82° C. (Example 1). The solid black line are the DSC measurements obtained for the cured RA #3 OS material; the dashed black lines show the tangential baseline before and after the step-transition used to determine the $T_g$; and the dotted line illustrates the location of the $T_g$ as the half-height distance between the indicated tangential baselines.

Figure 10:
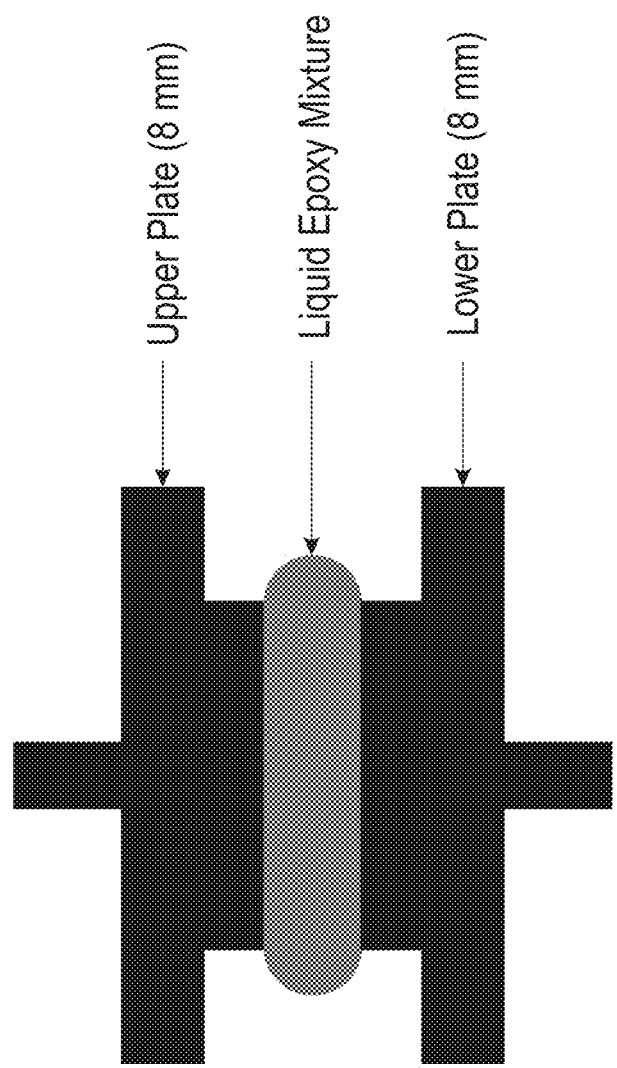
FIG. 10 is a diagram of the parallel plate geometry and sample set-up for rheological analyses (initial viscosity, work life, and thermal de-bondability) of adhesive materials.

FIG. 10 shows the parallel plate geometry and sample set-up for the rheological analyses (initial viscosity, work life, and thermal de-bondability) of the thermally reworkable adhesive materials described herein (Example 2). Identifying the initial viscosity of the uncured mixture is required for the development of the formulations. If the initial viscosity is too low, the formulation will flow excessively into undesired areas of a device. By contrast, if the initial viscosity is too high, mixing and application become impossible leading to heterogenous material properties.

Figure 11:
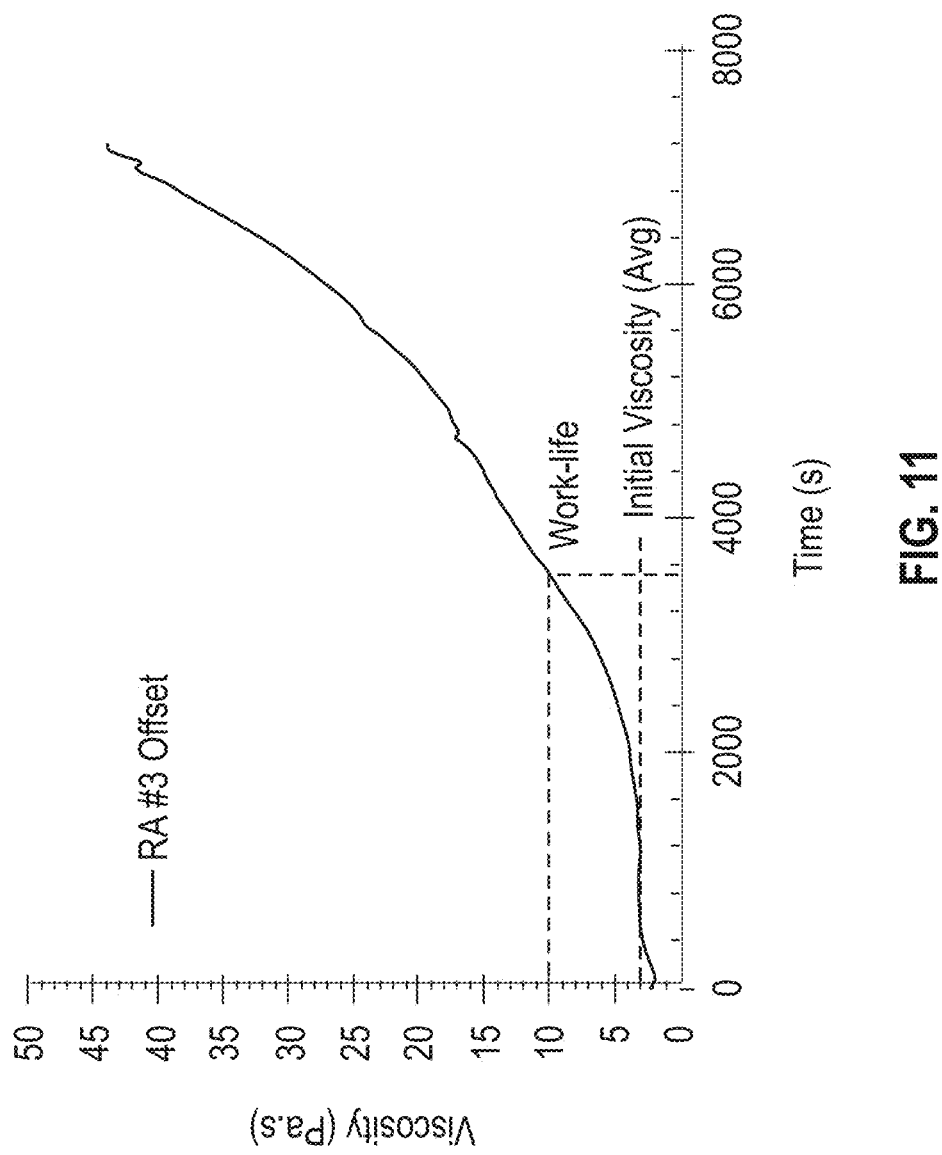
FIG. 11 is a graph showing time-dependent viscosity and the ranges for initial viscosity and work life for the RA #3 OS formulation at 25° C.

FIG. 11 is a graph showing viscosity as a function of time at a constant temperature of 25° C. and identifies the range for initial viscosity and work-life of the adhesive materials described herein (Example 3). For the RA #3 OS formulation, the temperature was set at 25° C. to monitor viscosity changes during mixing and device fabrication; however, it is to be understood that the temperature may be adjusted for a different material. The initial viscosity was determined as the average viscosity within the first two minutes of the experiment (calculating initial viscosity beyond the two-minute mark can result in erroneous initial viscosities if the material is rapidly curing at the temperature of the experiment). As shown therein, the RA #3 OS formulation had an average initial viscosity of 3000 cps (range of 2000-5000)

and a work life viscosity ranging from 2000-10000 cps (where 1 Pascal second, Pa·S=1000 centipoise, cps).

Figure 12:
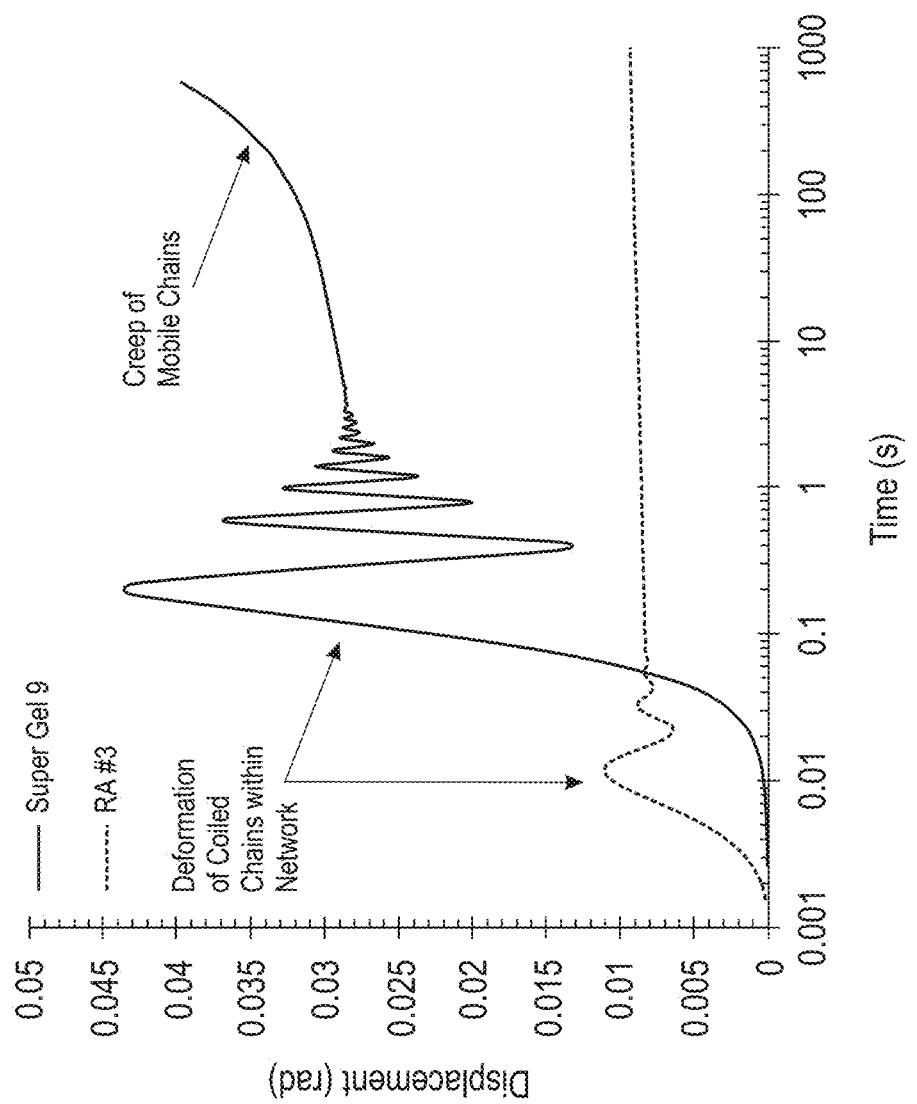
FIG. 12 is a graph showing time-dependent displacement (i.e., creep responses) for two materials, Super Gel 9 (Master Bond, Inc., Hackensack, NJ, USA) and the RA #3 formulation.

FIG. 12 is a graph showing displacement as a function of time, including creep responses for two materials, the highly crosslinked commercial epoxy Super Gel 9 (Master Bond, Inc., Hackensack, NJ, USA) and the RA #3 formulation (Example 4). With reference to the Super Gel 9, after initial deformation of the chains in the network, the displacement (i.e., the distance of deformation) plateaus; the oscillation for the Super Gel 9 shown in FIG. 12 is due to viscoelastic properties of the adhesive polymers. With reference to the RA #3 formulation, after initial deformation of the coiled chains at approximately 0.01-0.1 seconds, the mobile chains of the RA #3 formulation maintain a constant creep (i.e., permanent deformation) for extended times at a constant temperature of 25° C. and applied stress, thus providing a mechanism for the reworkable RA #3 adhesive to be removed thermally. The rate at which the constant creep phenomenon may occur will depend on the molecular weight of the material, the concentration of the mobile chains, the reworking temperature, and the stress applied.

In one embodiment, the thermally reworkable adhesive comprises at least one di-epoxide, at least one diamine that is reactive with the at least one di-epoxide, and at least one additive that is miscible, but not reactive, with the at least one di-epoxide and/or the at least one diamine, wherein (i) reaction of the at least one di-epoxide and the at least one diamine produces a crosslinked polymer network, (ii) the at least one additive offsets stoichiometry of the crosslinked polymer network by 5-50%, and (iii) the offset crosslinked polymer network comprises the thermally reworkable adhesive that once cured, can be de-bonded from a device to which it is attached at a temperature range of 50-200° C. In another embodiment, the thermally reworkable adhesive, once cured, can be de-bonded from a device to which it is attached at a temperature in the range of 50-100° C.

In another embodiment, the at least one additive is at least one functional filler that has a weight percent in the composition in a range of 5-20%. In a further embodiment, the at least one functional filler is a phenoxy-based resin.

In another embodiment, the at least one additive is at least one bulk filler having a weight percent in the composition in a range of 0.1-70%. In another embodiment, the at least one bulk filler is selected from the group consisting of aluminosilicate ash, fumed silica, aluminum trihydroxide, glass microspheres, milled glass fiber, chopped glass fiber, chopped glass strands, milled carbon fiber, and chopped polyethylene fibers, calcium carbonate, sawdust, powdered slate, ground olive stone, metal powder, and combinations thereof. In a further embodiment, the at least one bulk filler includes particles selected from the group consisting of silver, carbon black, carbon nanotubes, aluminum oxide, silicon dioxide, and combinations thereof.

In another embodiment, the at least one additive is at least one mono-functional epoxide. In a further embodiment, the at least one mono-functional epoxide is at least one reactive diluent and/or at least one adhesion promotor. In another embodiment, the at least one reactive diluent is epoxy butane and/or a glycidyl ether.

In a further embodiment, the thermally reworkable adhesive has a pre-cure initial viscosity in the range of 1500-3000 cps. In another embodiment, the thermally reworkable adhesive has a work-life viscosity in the range of 3000-10000 cps. In a further embodiment, the thermally reworkable adhesive is curable in a temperature range of 20-200° C. In another embodiment, the thermally reworkable adhesive is curable in a temperature range of 50-200° C. In a further embodiment, the thermally reworkable adhesive is curable in a temperature range of 50-100° C.

In a further embodiment, the molar ratio of the at least one di-epoxide to the least one diamine prior to reaction is 1.15-2.5. In another embodiment, the molar ratio of the at least one di-epoxide to the least one diamine prior to reaction is 1.25-2.25.

In a further embodiment, the thermally reworkable adhesive comprises at least one di-epoxide, at least one diamine that is reactive with the at least one di-epoxide; and at least one additive comprising at least one phenoxy-based resin and at least one reactive diluent, wherein the at least one additive is miscible, but not reactive, with the at least one di-epoxide and/or the at least one diamine, wherein (i) reaction of the at least one di-epoxide and the at least one diamine produces a crosslinked polymer network, (ii) the at least one additive offsets stoichiometry of the crosslinked polymer network by 5-50%, and (iii) the offset crosslinked polymer network comprises the thermally reworkable adhesive that once cured, can be de-bonded from a device to which it is attached at a temperature range of 50-100° C.

In application, the thermally reworkable adhesive is prepared by mixing a formulation comprising at least one di-epoxide, at least one diamine, and at least one additive to form a reworkable adhesive, wherein the at least one additive is miscible, but not reactive, with the at least one di-epoxide and/or the at least one diamine, wherein (i) the reaction of the at least one di-epoxide and the at least one diamine forms a crosslinked polymer network, (ii) the at least one additive offsets stoichiometry of the crosslinked polymer network by at least 5-50%, and (iii) the offset crosslinked polymer network comprises a reworkable adhesive; applying the reworkable adhesive to a device; curing the reworkable adhesive onto the device; heating the cured reworkable adhesive to a temperature in the range of 50-200° C.; and removing the cured reworkable adhesive from the device. As an optional step, a solvent may be applied during or after the heating of the cured reworkable adhesive in order to clean the device.

The thermally reworkable adhesive may be used on electronic devices, including without limitation, electronic circuits, integrated circuits, semiconductors, vacuum tubes, diodes, capacitors, inductors, resistors, transistors, embedded systems, optoelectronics, audio electronics, telecommunications, nanoelectronics, and sensory arrays.

The descriptions of the various aspects and/or embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the aspects and/or embodiments, the practical application or technical improvement over technologies found in the marketplace, or to enable others of ordinary skill in the art to understand the aspects and/or embodiments disclosed herein.

EXPERIMENTAL

The following examples are set forth to provide those of ordinary skill in the art with a complete disclosure of how to make and use the aspects and embodiments of the invention as set forth herein. While efforts have been made to ensure accuracy with respect to variables such as amounts, temperature, etc., experimental error and deviations should be taken into account. Unless indicated otherwise, parts are parts by weight, temperature is degrees centigrade, and pressure is at or near atmospheric. All components were obtained commercially unless otherwise indicated.

The samples from Table 2 were used in the following Examples. The chemicals in Table 2 were obtained at the following sources: EB, DGEBA, MMCH, and TMHD (Millipore Sigma, St. Louis, MO, USA); PKHC (Gabriel Performance Products, LLC, Akron, OH, USA); GLYMO (Evonik Industries AG, Essen, Germany). The results of the studies provided in the Examples for the samples of Table 2 are shown in Table 1.

Example 1

Determining the Glass Transition ($T_G$) of an Adhesive Material

The glass transition ($T_g$) of the adhesive materials was determined using differential scanning calorimetry (DSC), which monitors the relative heat flow in and out of a sample through programed thermal cycles. The DSC was set with a maximum temperature of 100° C. above which the IR detection performance would deteriorate. The operational temperature range for the DSC device fluctuated between −40° C. to 70° C. with an ideal $T_g$ residing above this temperature range in order to minimize stresses in the assembly. Factors considered when running the sample in DSC were: sample weight, shape, and texture (e.g., solid versus powder). A TA INSTRUMENTS® Q2000 (TA Instruments, Inc., New Castle, DE, USA) DSC device was used for temperature measurements and thermal analyses. Temperature scans from −90° C. to 200° C. were run with heating and cooling rates of 5° C./min with each sample exposed to two heating ramps and one cooling ramp. Dry nitrogen was used as the purge gas through the DSC cell at a flow rate of 50 mL/min. Samples were cut from cured bars (except when otherwise noted) and varied between 10-20 mg. Experiments were carried out using hermetic aluminum pans (TA Instruments, Inc.) and data analysis was performed using TRIOS software (TA Instruments, Inc.) with the $T_g$ reported as half-height of the step-transition observed during the second heating cycle. FIG. 9 shows the DSC thermogram for the RA #3 OS material, which has a $T_g$ of 82° C.

Example 2

Measuring Viscosity of an Adhesive Material

A TA INSTRUMENTS AR 2000ex rheometer was used for viscosity measurements. A disposable 8 mm parallel plate was used for the upper and lower geometry for ease of cleaning and minimal sample volume (larger disposable parallel plates can be used for lower viscosity materials or to minimize noise in the analysis). The gap used between the upper and lower 8 mm faces was kept constant at 1000 µm. Between the parallel plates, the adhesive material was loaded with ideal contact. In operation, the size and shape of the protruding meniscus may vary depending on the surface energy and viscosity of the mixture. FIG. 10 illustrates the parallel plate geometric set-up and sample set-up for the rheological analyses (initial viscosity, work life, and thermal de-bondability) of the thermally reworkable adhesive materials and FIG. 11 provides the viscosity measurement results for the RA #3 OS material.

Example 3

Establishing Work Life of an Adhesive Material at 25° C.

The results from the viscosity-time study (FIG. 11) were used to identify a work-life for the adhesive material after mixing. For an initial estimation, the time until the viscosity reached 10 Pa·s was selected for the reworkable materials. This number was determined through the experience of working with epoxies at varying viscosities. Materials whose initial viscosities were above this threshold were difficult to manipulate and apply without inclusions. The dashed lines in FIG. 11 shows the work-life for the RA #3 OS formulation.

Example 4

Thermal De-Bondability of an Adhesive Material

To ensure that the adhesive material may be removed from an adhered structure, the thermal de-bondability of the adhesive material was measured under the thermal constraints set forth in Example 3. Rheology measurements were used to evaluate the ability of the adhesive material to thermally de-bond from a structure. Working from the set-up shown in FIG. 10, the adhesive material, Super Gel 9 (Master Bond, Inc., Hackensack, NJ, USA) was fully cured between two 8 mm aluminum plates. After curing, a constant rotational stress was applied to the sample within the rheometer and the response were monitored at a constant temperature over a given amount of time. The results of the experiment for the Super Gel 9 and RA #3 formulation are shown in FIG. 12.

Example 5

Transmittance at 550 nm Wavelength

Figure 13A:
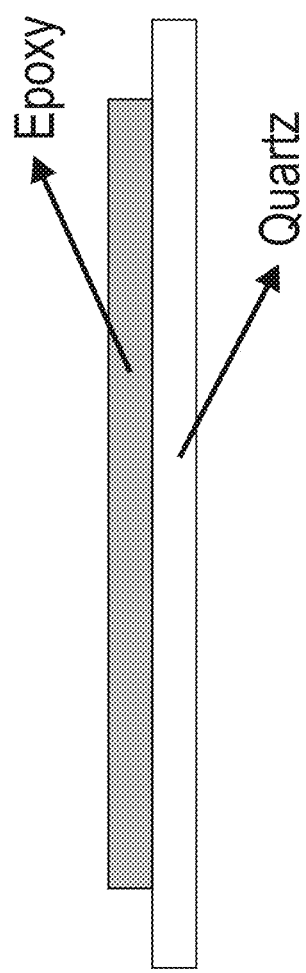
FIG. 13A is an illustration and FIG. 13B is a photograph showing the sample layering for UV-Vis spectroscopy to test the absorption of adhesive materials.
Figure 13B:
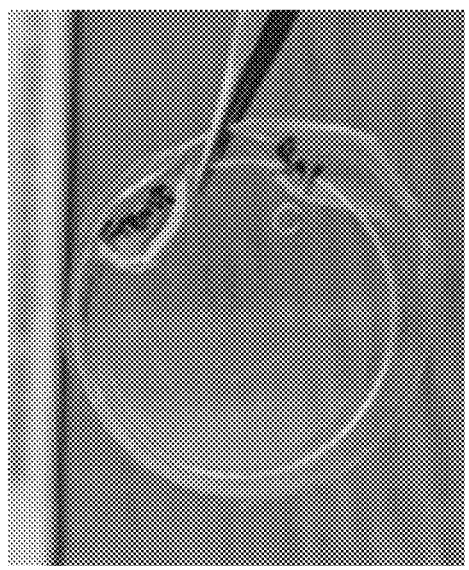
Figure 14:
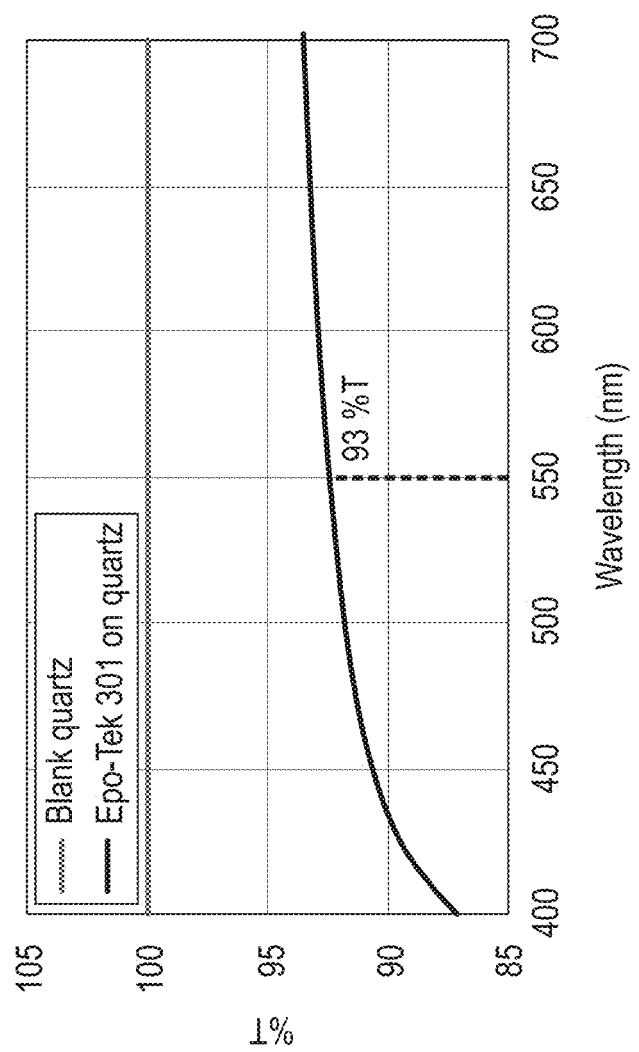
FIG. 14 is a graph showing temperature as a function of wavelength for the commercial epoxy EPO-TEK 301; the graph shows the absorption of the commercial epoxy at a wavelength range with the percent transmittance at 550 nm shown as 93% T.

UV-Vis spectroscopy was used to scan absorption (and subsequently transmittance) through wavelengths range from 350 to 800 nm. The samples were prepared by curing the adhesive material on a disc of quartz. For ease in sample prep and to minimize thickness variations between samples, a mold was designed to hold the epoxy liquid in contact with a one-inch quartz wafer during curing. FIG. 13A illustrates the quartz-epoxy layered sample set-up and FIG. 13B is a representative picture of a sample. The film thickness of the adhesive material was held constant at no more than 0.5 mm thick. The layered structure was analyzed in an Agilent Cary 5000 UV-Vis-NIR spectrophotometer (Agilent Technologies, Inc., Santa Clara, CA, USA). FIG. 14 compares the absorption of the commercial epoxy EPO-TEK 301 versus blank quartz in a range of interest. As shown therein, the EPO-TEK 301 had 93% transmission at 550 nm.

Example 6

Adhesion Through Thermal Cycling

Figures 15A, 15B:
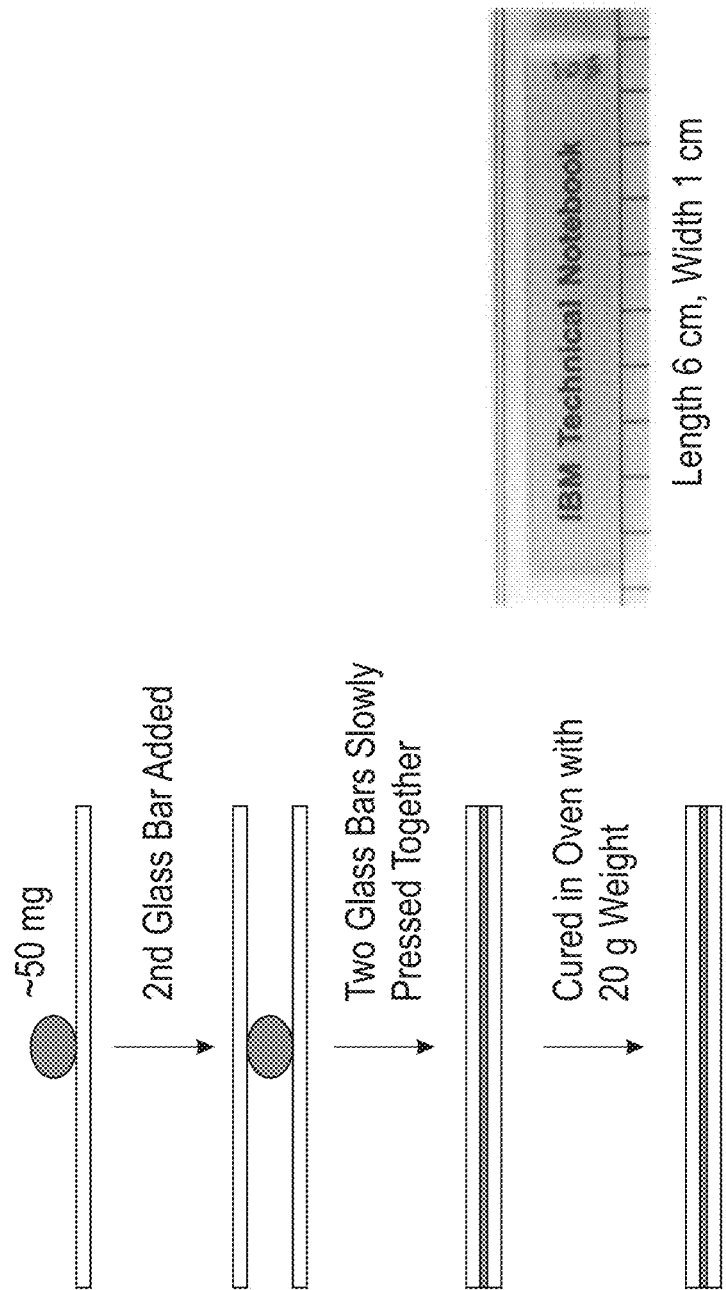
FIG. 15 is a diagram illustrating the sample preparation steps for thermal cycling testing of adhesive materials.

Thermal cycling was measured with a TA INSTRUMENTS Q800 Dynamic Mechanical Analyzer (TA Instruments, New Castle, DE, USA) (DMA). The controlled oscillation capabilities of the DMA provide some mimicry of the vibrations expected during use, while the enclosed sample environment permits precise control over temperatures from −140° C. to 300° C. Introduction of any inclusion, such as bubbles or dust, results in a stress concentration which will be exaggerated during the thermal cycling and cause premature failure of the material; thus, inclusions must be avoided for a successful analysis. FIG. 15 illustrates a method for sample preparation to minimize inclusions. The final film thickness is dependent on the viscosity of the mixture at the curing temperature and the amount of material initially deposited. The final weight of the adhesive material tested is determined from the difference in weight between the dry glass slides and the sandwiched sample (assuming a density of 1.0 for the adhesive material). For this experiment, a film thickness of ~10 μm was observed for the adhesive materials that were tested.

Figure 16:
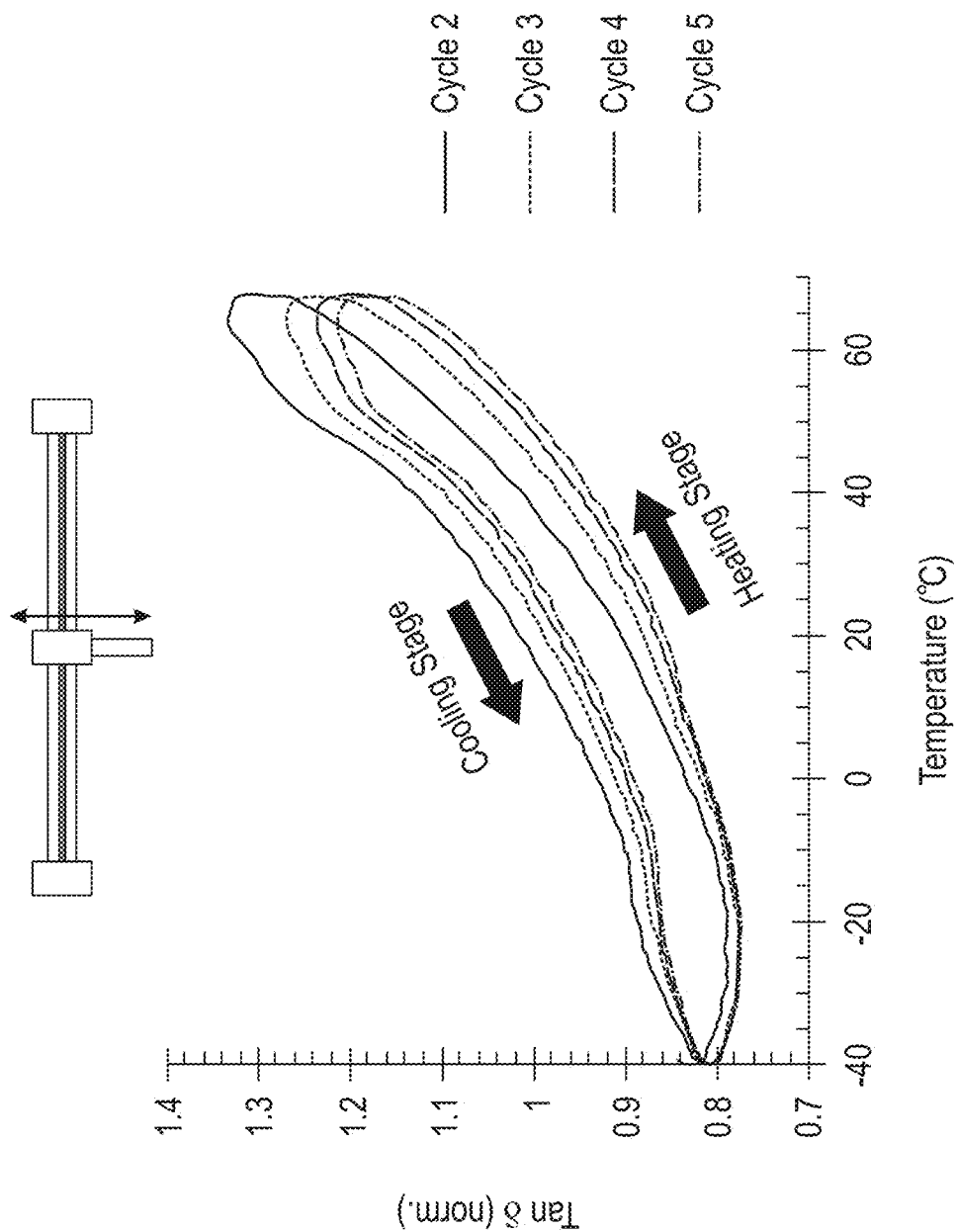
FIG. 16 is a graph showing the tangent of delta (tan δ) as a function of temperature for the commercial epoxy EPO-TEK 301; the graph shows the mechanical response of an epoxy-glass sandwich through thermal cycles 2-5.

FIG. 16 provides an example of the mechanical response observed within the DMA over five thermal cycles from −40 to 70° C. for the commercial epoxy EPO-TEK 301. A dual cantilever geometry was chosen as a close mimic to the expected compression and vibrational stresses experienced during use. Post experiment, the sample was optically inspected for any signs of discoloration, cracking, or delamination, of which there were none.

Example 7

Measuring Adhesion Strength

Figure 17A:
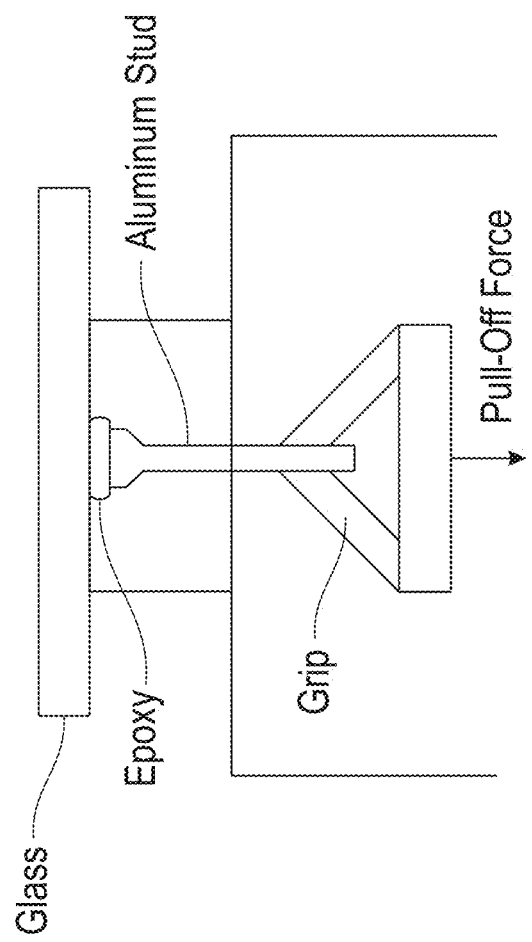
FIG. 17A is an illustration and FIG. 17B is a photograph showing a stud pull apparatus used to measure adhesion strength of an adhesive material to a device.
Figure 17B:
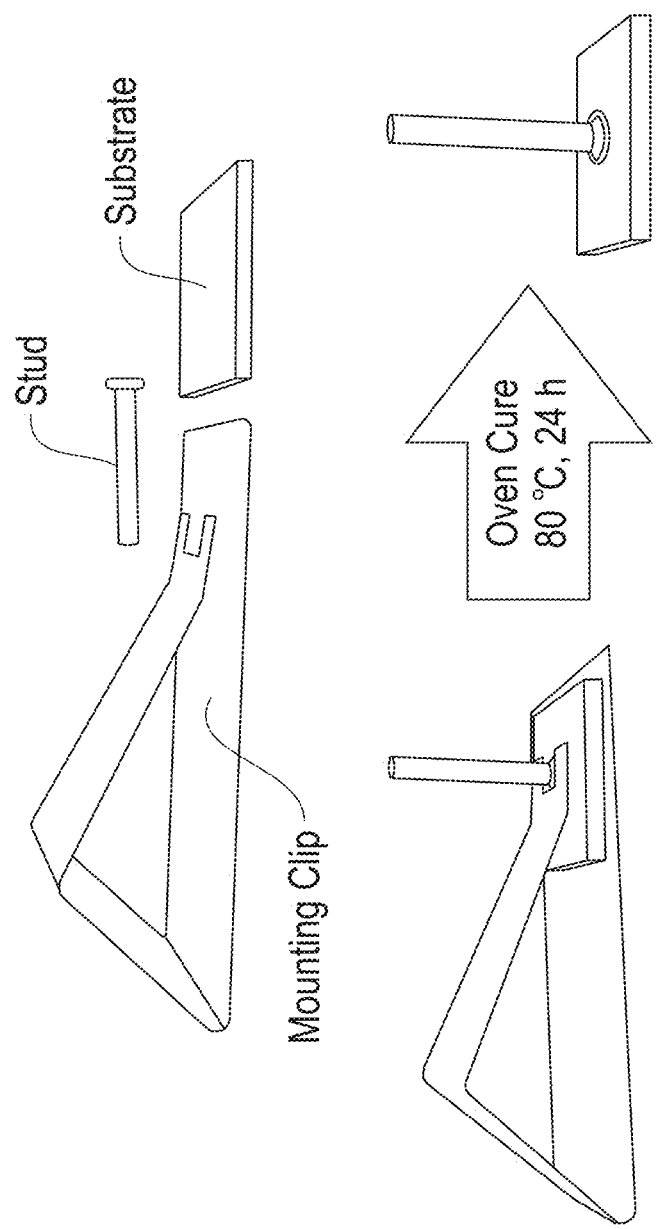

The adhesion strength of the thermally reworkable materials were measured with a Quad Group Romulus IV (Quad Group, Inc., Spokane, WA, USA) equipped with a stud pull adherence module. A diagram of the apparatus and sample preparation used to measure the adhesion strength of the adhesive materials is shown in FIG. 17. In application, force was applied to the aluminum stud, which was adhered to the substrate by the cured adhesive material. The adhesion strength was determined by the force required to remove the stud from the substrate and the size of the stud-face chosen. The instrument software provided the force (N) required to remove the stud and the subsequent adhesion strength (MPa).

Example 8

Differentiating Reworkable Adhesive from Typical Cross-linked Polymer Adhesives

Figure 18:
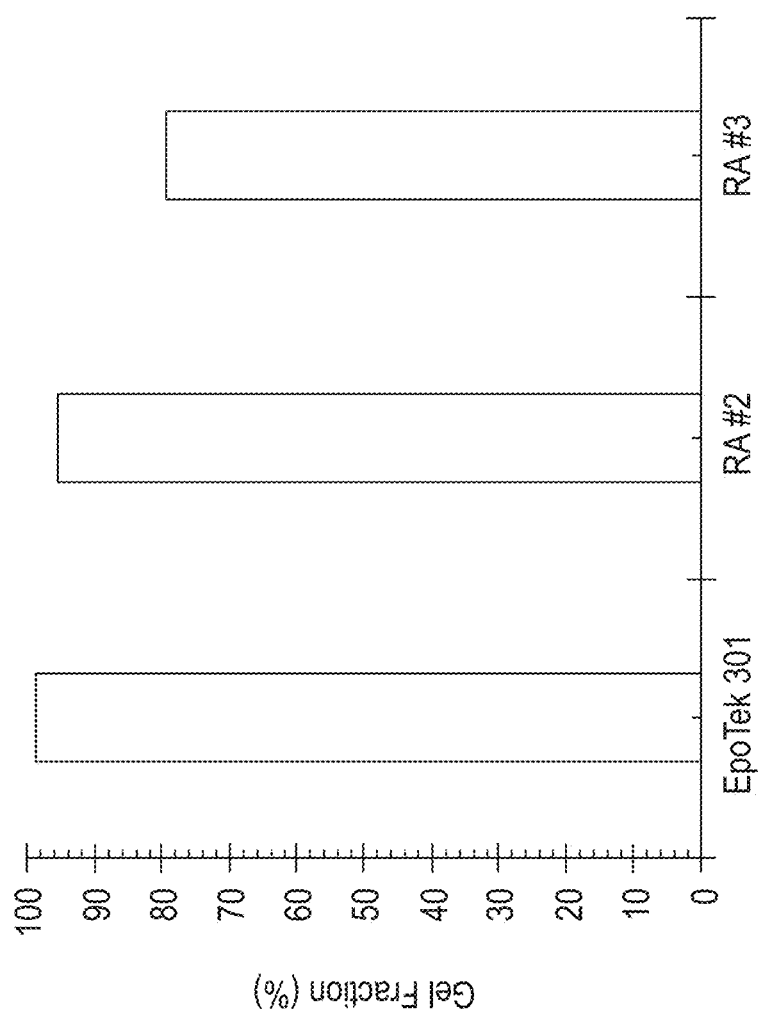
FIG. 18 is a bar graph showing the gel fraction percent for the commercial epoxy EPO-TEK 301 and the RA #2 and RA #3 adhesive formulations.

Gel fraction measurements was used to differentiate the reworkable adhesives described herein from typical cross-linked polymer adhesives. Gel fractions were measured by soaking 0.5 g cured epoxy bars in a swelling solvent (e.g. THF) overnight at 60° C. Any soluble fraction within the material was extracted leaving the insoluble gel swollen in the solvent. The insoluble swollen gel was filtered from the solvent and subsequently dried in a vacuum oven to remove any residual solvent remaining in the swollen gel. The remaining gel fraction was calculated as the ratio of the (dry) residual weight to the (dry) initial weight of the sample. FIG. 18 shows the gel fraction percentages for the commercial epoxy EPO-TEK 301 and the reworkable adhesives RA #2 and RA #3.

We claim:

1. A composition comprising:
   at least one di-epoxide present in the composition in a weight ratio range of 55-73%;
   at least one diamine that is reactive with the at least one di-epoxide and is present in the composition in a weight ratio range of 12-18%; and
   at least one additive that is miscible, but not reactive, with the at least one di-epoxide and/or the at least one diamine, the at least one additive including at least one epoxide, and the at least one additive including a phenoxy-based functional filler having a weight percent in the composition in a range of 5-20%,
   wherein a reaction of the at least one di-epoxide and the at least one diamine produces a crosslinked polymer network,
   wherein the crosslinked polymer network comprises a thermally reworkable adhesive that once cured, can be de-bonded from a device to which it is attached at a temperature range of 50-200° C., and
   wherein a molar ratio of the at least one di-epoxide and the at least one additive to the least one diamine is present in the composition in a molar ratio of 1.66 to 2.16.

2. The composition of claim 1, wherein the at least one additive includes at least one bulk filler having a weight percent in the composition in a range of 0.1-70%.

3. The composition of claim 2, wherein the at least one bulk filler is selected from the group consisting of aluminosilicate ash, fumed silica, aluminum trihydroxide, glass microspheres, milled glass fiber, chopped glass fiber, chopped glass strands, milled carbon fiber, and chopped polyethylene fibers, calcium carbonate, sawdust, powdered slate, ground olive stone, metal powder, and combinations thereof.

4. The composition of claim 2, wherein the at least one bulk filler includes particles selected from the group consisting of silver, carbon black, carbon nanotubes, aluminum oxide, silicon dioxide, and combinations thereof.

5. The composition of claim 1, wherein the at least one additive includes at least one mono-functional epoxide.

6. The composition of claim 5, wherein the at least one mono-functional epoxide includes at least one reactive diluent and/or at least one adhesion promotor.

7. The composition of claim 6, wherein the at least one reactive diluent includes epoxy butane and/or a glycidyl ether.

8. The composition of claim 1, wherein the thermally reworkable adhesive has a pre-cure initial viscosity in the range of 1500-3000 cps.

9. The composition of claim 1, wherein the thermally reworkable adhesive is curable in a temperature range of 20-200° C.

10. The composition of claim 1, wherein the thermally reworkable adhesive is curable in a temperature range of 50-100° C.

11. A composition comprising:
    at least one di-epoxide present in the composition in a weight ratio range of 55-73%;
    at least one diamine that is reactive with the at least one di-epoxide and is present in the composition in a weight ratio range of 12-18%; and
    at least one additive comprising a phenoxy-based functional filler having a weight percent in the composition in a range of 5-20%, at least one reactive diluent, and at least one epoxide, wherein the at least one additive is miscible, but not reactive, with the at least one di-epoxide and/or the at least one diamine,
    wherein a reaction of the at least one di-epoxide and the at least one diamine produces a crosslinked polymer network,
    wherein the crosslinked polymer network comprises a thermally reworkable adhesive that once cured, can be de-bonded from a device to which it is attached at a temperature range of 50-100° C., and
    wherein a molar ratio of the at least one di-epoxide and the at least one additive to the least one diamine is present in the composition in a molar ratio of 1.66 to 2.16.

12. The composition of claim 11, wherein the at least one additive comprises at least one mono-functional epoxide.

13. A method comprising:
    mixing a formulation comprising at least one di-epoxide present in the composition in a weight ratio range of 55-73%, at least one diamine that is reactive with the at least one di-epoxide and is present in the composition in a weight ratio range of 12-18%, and at least one additive, the at least one additive including at least one epoxide, and the at least one additive including a phenoxy-based functional filler having a weight percent in the composition in a range of 5-20%, wherein (i) the at least one additive is miscible, but not reactive, with the at least one di-epoxide and/or the at least one diamine; (ii) a reaction of the at least one di-epoxide and the at least one diamine produces a crosslinked polymer network, and (iii) the crosslinked polymer network comprises a thermally reworkable adhesive;

applying the thermally reworkable adhesive to a device;

curing the thermally reworkable adhesive onto the device;

heating the cured thermally reworkable adhesive to a temperature in the range of 50-200° C.; and removing the cured thermally reworkable adhesive from the device, wherein a molar ratio of the at least one di-epoxide and the at least one additive to the least one diamine is present in the formulation in a molar ratio of 1.66 to 2.16.

* * * * *